United States Patent

[11] 3,613,739

| [72] | Inventor | Cyril M. Atkinson<br>Carnforth, England |
|---|---|---|
| [21] | Appl. No. | 862,400 |
| [22] | Filed | Sept. 30, 1969 |
| [45] | Patented | Oct. 19, 1971 |
| [73] | Assignee | Northrop Weaving Machinery Limited<br>Daisyfield, Blackburn, England |
| [32] | Priority | Oct. 12, 1968 |
| [33] | | Great Britain |
| [31] | | 48,466/68 |

[54] LOOM LETOFF AND TAKEUP MECHANISMS
7 Claims, 2 Drawing Figs.

[52] U.S. Cl. .................................................. 139/1,
139/100, 139/304
[51] Int. Cl. .................................................. D03d 49/00,
49/04
[50] Field of Search .......................................... 139/100,
304, 307, 308, 310, 311, 1, 99, 1 E

[56] References Cited
UNITED STATES PATENTS

| 676,376 | 6/1901 | Whitehurst.................. | 139/307 X |
| 1,588,025 | 6/1926 | Harris............................ | 139/100 |
| 2,346,615 | 4/1944 | Santon ........................ | 139/304 X |
| 3,366,147 | 1/1968 | Picanol......................... | 139/100 |

FOREIGN PATENTS

| 717,328 | 9/1965 | Canada ........................ | 139/310 |
| 597,447 | 1/1948 | Great Britain................. | 139/1 |

*Primary Examiner*—James Kee Chi
*Attorney*—Norris & Bateman

ABSTRACT: A transmission unit for a loom letoff or takeup mechanism producing an intermittent drive comprises a driving shaft, a worm mounted on said driving shaft for rotation therewith but having freedom for axial movement relatively to said driving shaft, a driven shaft, a worm wheel fixed on said driven shaft for rotation therewith, said worm and said worm wheel being adapted to mesh with one another, and a cam means operative on said worm to cause axial movement of said worm during part of its rotation, said cam means comprising an annular cam surface formed on one end of said worm.

PATENTED OCT 19 1971 3,613,739
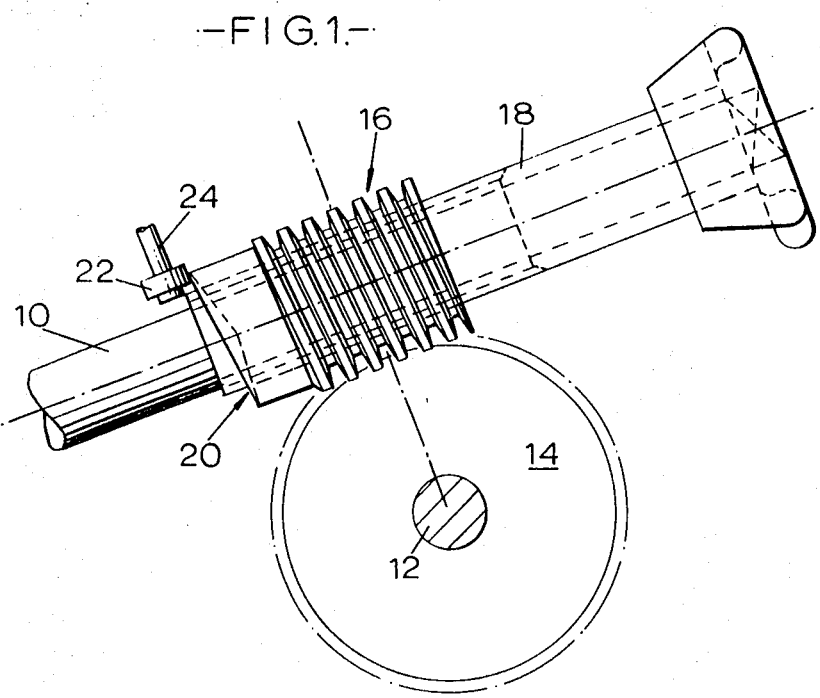
—FIG.1.—
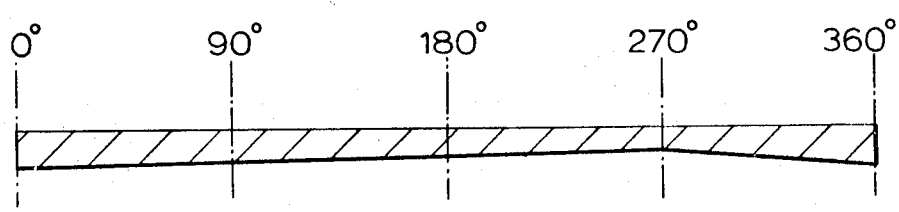
—FIG.2.—
INVENTOR:
CYRIL MILLWARD ATKINSON
BY
Norris & Bateman

LOOM LETOFF AND TAKEUP MECHANISMS

The letoff and/or takeup mechanism of a loom (including the drive to the cloth roller) may be continuously or intermittently driven. A constant drive for one of these mechanisms may take the form of a worm and worm wheel, the wormshaft being driven through gearing from the loom drive. An intermittent drive usually takes the form of a ratchet-and-pawl device, the pawl being oscillated by a crank driven by the loom drive.

Each of these mechanisms has its own advantages and for any particular cloth one or the other may be desirable. The object of this invention is to provide a transmission unit for use in a takeup or letoff mechanism of a loom which combines the advantages of the continuous and intermittent drives.

According to this invention a transmission unit for a loom letoff or takeup mechanism comprises a driving shaft, a worm mounted on the driving shaft for rotation therewith, but having freedom for axial movement relatively to the driving shaft, a driven shaft, a wormwheel, meshing with the worm and fixed on the driven shaft for rotation therewith, and cam means operative on the worm to cause axial movement of the worm during part of its rotation.

The cam means may comprise an annular cam surface formed on one end of the worm engageable with a roller on a fixed part of the machine. Preferably, the cam means can be cancelled to allow the unit to operates as a continuous drive.

The method of operation of the invention will be apparent from the following description of drive unit in accordance with the invention, which is described by way of example only with reference to the accompanying drawings, in which:

FIG. 1 shows a worm and worm wheel incorporating a cam means, and,

FIG. 2 is a diagrammatic representation of the pitch line of the circumference of the cam.

Referring to FIG. 1 of the accompanying drawings essentially the unit comprises a driving shaft 10 which is adapted to be continuously rotated by the loom-driving mechanism (not shown), a driven shaft 12 at right angles to the driving shaft 10 and adapted to drive the warp beam, takeup roller or winding-on roller as the case may be, and a worm gear mechanism between the two shafts.

The worm wheel 14 is keyed on to the driven shaft 12 in the usual manner and requires no further description. The worm 16 is formed on a sleeve 18 which is splined on the driving shaft 10, so that it must rotate with that shaft, but is free to move axially thereon.

At one end the sleeve 18 is formed with an annular cam surface 20 and this is engaged by a roller 22 mounted on a stub shaft 24 fixed to a part of the machine. The cam has two helical portions sloping in opposite directions (as shown in FIG. 2), the first enveloping say 270° about the worm axis and the second the remaining 90°.

The operation of the drive unit is as follows:

During the first 270° movement of the driving shaft 10 about its axis, the cam causes the worm 16 to move axially on the shaft 10. Although the worm 16 rotates, it does not rotate the worm wheel 14 because of the axial movement, instead it simply screws itself on the worm wheel 14. The tension in the threads or cloth on the roller creates a torque applied to the worm wheel 14, which in turn applies an end thrust on the worm 16 keeping the follower roller 22 against the cam 20. During the last 90° of rotation, the worm sleeve 18 moves back axially with the cam and this turns the worm wheel 14. All the motion is transmitted to the wheel during this 90° and therefore the wheel has the same motion as would be applied by a ratchet-and-pawl device.

If a continuous drive is required, it is only necessary to remove the cam and then the worm and worm wheel drive functions normally.

I claim:

1. A transmission unit for a loom drive mechanism comprising a driving shaft, a worm mounted on said driving shaft for rotation therewith but having freedom for axial movement relatively to said driving shaft, a driven shaft, a worm wheel continuously meshed with said worm and fixed on said driven shaft for rotation therewith, and a cam means operative on said worm to cause controlled axial movement of said worm during its rotation for imparting predetermined intermittent rotation to said driven shaft.

2. A transmission unit for a loom as claimed in claim 1, wherein said cam means cooperates with a fixed abutment means on said loom, said cam means comprising an axially facing annular cam surface formed on said worm.

3. A transmission unit for a loom as claimed in claim 2, wherein said fixed abutment means comprises a roller on a fixed part of sad loom engaging with said annular surface of said cam.

4. A transmission unit for a loom as claimed in claim 1, including cam cancellation means to allow said unit to operate as a continuous drive.

5. The drive transmission unit defined in claim 1, wherein said controlled axial movement of the worm is such that the worm is moved in one axial direction during part of its rotation so that no rotation is thereby imparted to said worm wheel and said worm is oppositely axially moved during the remainder of its rotation wherein it rotates said worm wheel.

6. The drive transmission unit defined in claim 2, wherein said worm is fixed on a sleeve nonrotatably and slidably mounted on said driving shaft, and said annular cam surface is formed on said sleeve.

7. The drive transmission unit defined in claim 2, wherein said cam surface comprises a plurality of angularly related faces, and said abutment means is a roller mounted on a fixed axis.